US006230074B1

(12) United States Patent
Shinkai

(10) Patent No.: US 6,230,074 B1
(45) Date of Patent: May 8, 2001

(54) HIGH-CAPACITY JUKEBOX DEVICE FOR STORING AND ACCESSING COMPUTER-READABLE MEDIA

(75) Inventor: Hiroyuki Shinkai, San Diego, CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/099,056

(22) Filed: Jun. 17, 1998

(51) Int. Cl.[7] ......................................... G60F 7/00
(52) U.S. Cl. ........................ 700/214; 700/218; 700/222
(58) Field of Search ................... 700/214, 218, 700/222, 236, 244

(56) References Cited

U.S. PATENT DOCUMENTS

| | | | | |
|---|---|---|---|---|
| 5,010,536 | * | 4/1991 | Wanger et al. | 369/36 |
| 5,504,873 | * | 4/1996 | Martin et al. | 395/438 |
| 5,528,566 | * | 6/1996 | McGee et al. | 369/37 |
| 5,615,345 | * | 3/1997 | Wanger | 395/309 |
| 5,644,714 | * | 7/1997 | Kikinis | 395/200.03 |
| 5,745,458 | * | 4/1998 | Oliver et al. | 369/54 |
| 5,920,709 | * | 7/1999 | Harting et al. | 395/309 |
| 5,926,341 | * | 7/1999 | Mueller et al. | 360/92 |
| 5,941,963 | * | 8/1999 | Charles et al. | 710/62 |
| 5,946,708 | * | 8/1999 | Fang et al. | 711/113 |
| 5,995,347 | * | 11/1999 | Smith et al. | 369/178 |
| 6,009,470 | * | 12/1999 | Watkins | 709/231 |

OTHER PUBLICATIONS

Elphick, Mike, Building Bridges to 1394, Computer Design's: Electronic Systems Technology & Design, Sep. 1997, vol. 36, Issue 9, p18.*

New products: Drives, networks, utilities, & more, EMedia Professional, v10 n9, p18–23, Sep. 1997.*

Yamaha Ships CD-RW Drive with Industry's Fastest Rewrite and audio Ripping speeds., PR Newswire, Jun. 2000.*

* cited by examiner

Primary Examiner—Christopher P. Ellis
Assistant Examiner—Michael E Butler
(74) Attorney, Agent, or Firm—Wagner, Murabito & Hao LLP

(57) ABSTRACT

A high-capacity jukebox device for storing and accessing computer readable media. The present invention comprises a 1394-to-ATAPI bridge for coupling to other devices via an IEEE 1394 bus, an ATAPI drive coupled to the ATAPI bridge for communicating with the other devices, and a jukebox controller for controlling the robotics mechanism of the jukebox device. Significantly, according to one embodiment of the present invention, the ATAPI drive comprises a first serial port and the ATAPI jukebox controller includes a second serial port coupled to the first serial port for communicating with the ATAPI drive. In this way, the expensive conventional SCSI LSI and SCSI firmware are eliminated from the jukebox controller, effectively lowering the manufacturing and development costs of the jukebox of the present invention. An additional benefit is that ATAPI drives are less costly than SCSI drives and are more widely available. Since most commercially available embedded processors include a serial interface, implementation cost for such a design is also low, and modifications to existing ATAPI drives are also minimal. Another benefit of the jukeboxes of the present invention is that a large number of them can be daisy-chained together.

18 Claims, 3 Drawing Sheets

HIGH-CAPACITY JUKEBOX DEVICE FOR STORING AND ACCESSING COMPUTER-READABLE MEDIA

FIELD OF THE INVENTION

The present invention relates to the field of multimedia electronic equipment. More particularly, the present invention relates to electronic equipment for playing audio compact discs (CDs) and other computer-readable media.

BACKGROUND OF THE INVENTION

Much of a computer system's functionality and usefulness to a user is derived from the functionality of the peripheral devices. For example, the speed and responsiveness of the hard disk drive is a major factor in determining a computer system's overall performance. Or, for example, the speed with which audio or video files can be retrieved from a DVD-ROM determines the computer system's usefulness as an entertainment device. Hence, the rate at which data can be transferred among the various peripheral devices often determines whether the computer system is suited for a particular purpose. To this end, the electronics industry has, over time, developed several different high-performance peripheral interfaces. One standard interface, the Small Computer Systems Interface (SCSI), has become widely used for connecting external peripheral devices to the host computers.

The SCSI interface is widely used in personal computers and workstations, and particularly in large external peripheral devices such as CD-ROM jukeboxes. CD-ROM jukeboxes are essentially large capacity CD-ROM changers that store a large number of audio CDs or CD-ROMs. A typical SCSI CD-ROM jukebox, such as the SONY-CDL1100 jukebox, has the capability of storing and playing fifty to a hundred audio CDs or CD-ROMs.

FIG. 1 illustrates a block diagram of a conventional SCSI CD-ROM jukebox 100. As illustrated, SCSI CD-ROM jukebox 100 includes two identical SCSI CD-ROM drives 130a and 130b coupled to a host computer (not shown) via a SCSI bus 110. In addition, SCSI CD-ROM jukebox 100 includes a SCSI jukebox controller 140 coupled to receive jukebox commands from the host computer via SCSI bus 110. Further, SCSI jukebox controller 140 is coupled to control robotics mechanisms (not shown) for mechanically moving CD-ROMs into and out of SCSI CD-ROM drives 130a and 130b. SCSI jukebox controller 140 is coupled to provide "load/unload" signals to SCSI CD-ROM drives 130a and 130b for controlling the of loading and unloading of the CD-ROMs. SCSI jukebox controller 140 may also be coupled to SCSI CD-ROM drives 130a and 130b to receive status signals such as chucking and unchucking status of the media. A front panel interface 150 having a LCD screen 152 for displaying status and error message of the SCSI jukebox controller 140 may also be coupled to SCSI jukebox controller 140. Further, as illustrated, SCSI CD-ROM drives 130a and 130b, and SCSI jukebox controller 140 each includes SCSI LSI circuits 141, SCSI firmware 142, and embedded processor 143 for processing SCSI commands.

In operation, SCSI jukebox 100 receives jukebox command signals from the host computer (not shown) via SCSI bus 110. According to the jukebox command signals, the SCSI jukebox controller 140 sends control signals to the robotics mechanism for controlling the movement of the CDs or CD-ROMs. SCSI jukebox controller 140 also sends "load/unload" signals to the SCSI CD-ROM drives 130a and 130b for controlling the timing of the loading and unloading of the disks and chucking and unchucking of the media. SCSI jukebox controller 140, however, does not control access operations, such as playing and pausing, of the SCSI CD-ROM drives 130a and 130b. Rather, the host computer accesses the SCSI CD-ROM drives 130a and 130b using SCSI CD-ROM driver software resident in the host computer. In some conventional SCSI jukeboxes, a user can also control the loading and unloading of the SCSI CD-ROM drives via control knobs 151 of front panel interface 150.

Although conventional SCSI CD-ROM jukeboxes (as shown in FIG. 1) are useful for their intended purposes, one significant drawback of such SCSI CD-ROM jukeboxes is that only two such jukeboxes can be daisy-chained together in one system. The SCSI interface allows only eight devices (e.g. eight IDs) to be coupled to the SCSI bus, whereas each jukebox unit 100 includes at least three SCSI IDs—two IDs for the SCSI CD-ROM drives, and one ID for the SCSI jukebox controller. In today's computer applications, particularly in database systems where literally thousands of CD-ROMs are used, the limitation in the number of daisy-chainable jukeboxes significantly undercuts the usefulness of these devices.

Another significant drawback of conventional SCSI CD-ROM jukeboxes 100 is that the manufacturing costs are high. SCSI CD-ROM drives included in SCSI jukeboxes 100 are quickly becoming extinct in a market dominated by AT Attachment Peripheral Interface (ATAPI) CD-ROM drives. Most CD-ROM drive makers have abandoned the SCSI market due to an eroding profit margin and low volume. This is especially true for the DVD-ROM drive market where high-speed SCSI DVD-ROM drives are virtually non-existent. Thus, it is not cost effective to manufacture CD-ROM or DVD-ROM jukeboxes using SCSI devices.

In addition, a high developmental cost for SCSI jukeboxes makes these devices even less cost-effective. The SCSI interface is complicated and requires expensive SCSI LSI circuits and firmware. Ironically, using the SCSI interface in the jukebox is not particularly advantageous. For instance, most parts of the complicated SCSI LSI circuits and firmware are unused because only simple commands, such as "move" or "check status," are sent infrequently from the host computer to the SCSI jukebox controller 140. Furthermore, communication speed between the host computer and the SCSI jukebox controller 140 can be slow because it takes seconds or tens of seconds for the robotics mechanism to move and retrieve the CD-ROMs.

Furthermore, in conventional SCSI CD-ROM jukeboxes, the SCSI jukebox controller 140 only controls the timing of loading and unloading of the CD-ROMs. No other communication paths exist between the SCSI CD-ROM drives and the SCSI jukebox controller. Thus, inventory information is not shared between the CD-ROM drives and the jukebox controller 140. Although it is technically possible to include a data path between the SCSI CD-ROM and the SCSI jukebox controller such that inventory information may pass from the drives to the jukebox controller, that solution requires an additional set of SCSI firmware, and further increases the costs for such CD-ROM jukeboxes.

Thus, what is needed is novel jukebox for computer-readable media which overcomes the aforementioned shortcomings of conventional SCSI CD-ROM jukeboxes. The present invention provides a novel and unique solution that is cost-effective and can be easily built from existing components with minimal modifications.

SUMMARY OF THE INVENTION

The present invention is a novel jukebox device for computer-readable media comprising an ATAPI drive for reading computer-readable media such as CD-ROMs or DVD-ROMs, robotics mechanism for moving computer-readable media from storage slots to the ATAPI drive, and an ATAPI jukebox controller for controlling the robotics mechanism. Significantly, the ATAPI drive comprises a first serial port and the ATAPI jukebox controller includes a second serial port coupled to the first serial port for communicating with the ATAPI drive. In one embodiment, the jukebox controller is not directly connected to the host computer. In this way, expensive logic circuits and firmware are no longer implemented in the jukebox controller, effectively lowering the manufacturing and development costs of the jukebox. An additional benefit is that ATAPI drives are less costly than SCSI drives and are more widely available. Furthermore, because most commercially available embedded processors include a serial interface, and because modifications to existing ATAPI drives are minimal, implementation cost for the present invention is lower.

One embodiment of the present invention comprises a front panel interface which allows a user to use the jukebox as a stand alone audio or video appliance to play audio CDs or video DVDs without host PC intervention. In this embodiment, user commands are first communicated to the ATAPI jukebox controller via the front panel interface. User commands are then communicated to the ATAPI drive(s) via the serial port connection. The jukebox controller, upon receiving the user commands, controls the robotics mechanism to retrieve the appropriate disks. User commands may include "Play," "Pause," etc., and slot numbers for indicating the particular disks to be played.

Another embodiment of the present invention may include an IEEE 1394-to-ATAPI bridge (ATAPI bridge) for coupling the jukebox to other devices via an IEEE 1394 bus. The IEEE 1394 interface allows multiple jukeboxes to be daisy-chained. As a result, more jukeboxes may be daisy-chained to provide a large on-line capacity. Further, the IEEE 1394 bus allows devices to be hot-plugged without rebooting the host computer. In addition, using the IEEE 1394 bus to daisy chain multiple devices together such that data may be transmitted from one device to another without host PC intervention.

In yet another embodiment, the present invention may include an ATAPI CD-ROM or DVD-ROM drive coupled to an ATA hard disk drive (HDD). In this embodiment, the HDD acts as the local storage for caching CD-ROM or DVD-ROM data to compensate for the slow access time of the robotics mechanism and drive. Further, the HDD may be used for storing music titles, lyrics, etc. (e.g. SONY MIDAS database) and mini-disc (MD) quality audio tracks converted from CD titles in the jukebox using the companion encoder software running on the PC. In this embodiment, although the jukebox includes only a single drive, mini-disc (MD) quality music may be played while the jukebox is simultaneously accessing other CD-ROM titles in the jukebox.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

Figure 1:
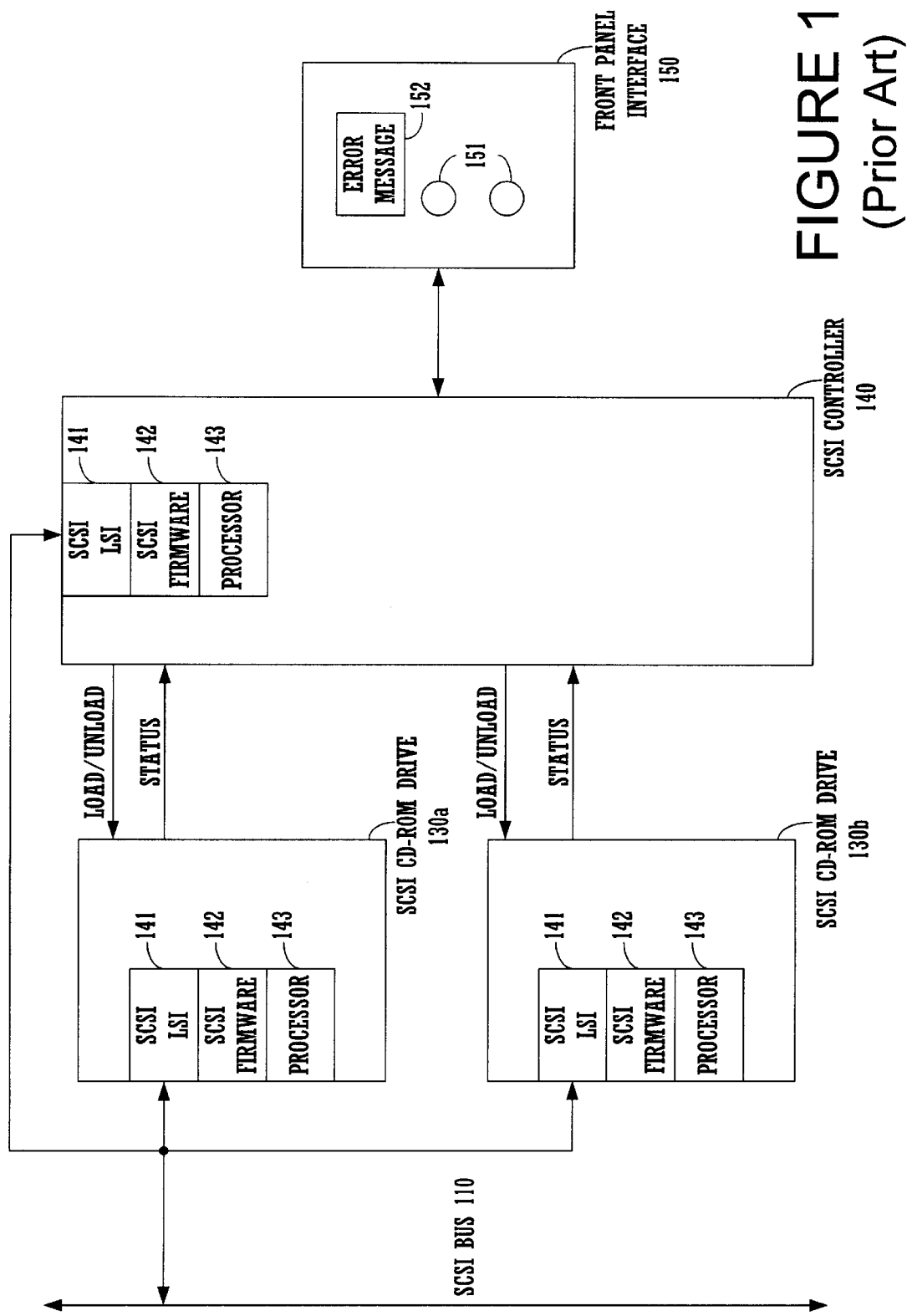
FIG. 1 illustrates a block diagram of a prior art CD-ROM jukebox.
Figure 2:
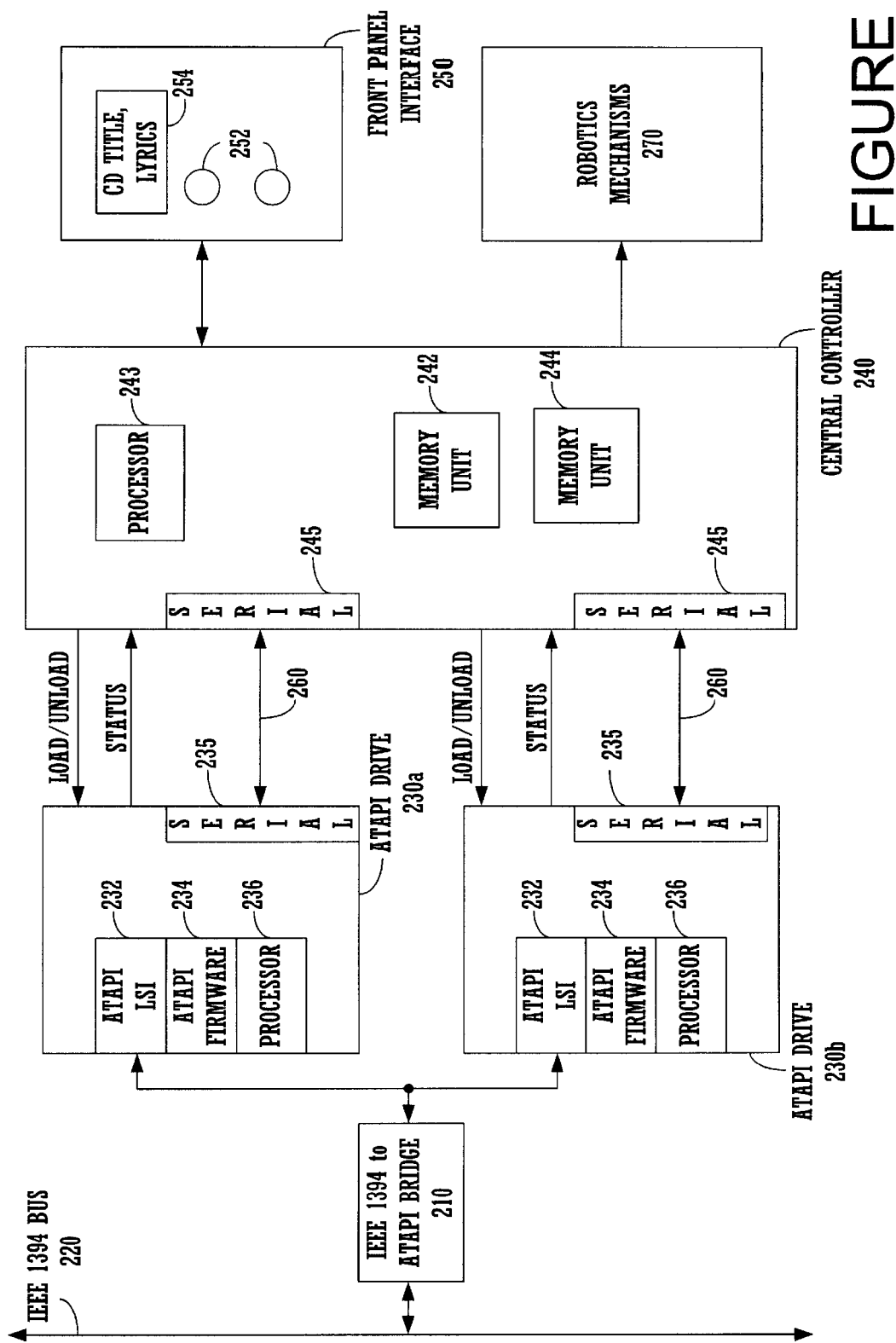
FIG. 2 illustrates a block diagram of a jukebox device according to one embodiment of the present invention.

FIG. 2 illustrates a block diagram of a jukebox device 200 for computer-readable media, such as compact-discs (CDs), compact-discs read-only-memories (CD-ROMs), digital-video-disks read-only-memories (DVD-ROMs), etc., according to one embodiment of the present invention. As illustrated, jukebox 200 includes an IEEE 1394-to-ATAPI bridge (ATAPI bridge) 210 for coupling to an IEEE 1394 bus 220, two modified ATAPI drives 230a and 230b coupled to ATAPI bridge 210 for receiving jukebox control signals from a host computer (not shown) and for transferring data to and from other devices coupled to the IEEE 1394 bus 220. ATAPI drives 230a and 230b further include ATAPI LSI circuits 232, ATAPI firmware 234, and processor 236. A jukebox controller 240 is coupled to the ATAPI drives 230a and 230b for receiving controller signals. In addition, jukebox controller 240 is coupled to control robotics mechanisms 270 for mechanically moving computer-readable media from storage slots (not shown) to the ATAPI drives 230a and 230b. Furthermore, a front panel interface 250 is coupled to jukebox controller 240. Significantly, ATAPI drives 230a and 230b each includes a serial port 235, and the jukebox controller 240 includes two serial ports 245 for forming serial connections 260. In addition, jukebox controller 240 includes a processor 243 for processing controller signals and controlling robotics mechanisms 270.

In the particular embodiment of the present invention as shown in FIG. 2, ATAPI drives 230a and 230b are modified from standard ATAPI CD-ROM/DVD-ROM drives. Standard ATAPI CD-ROM/DVD-ROM drives do not have communication paths for coupling to robotics controller 240 of jukebox 200. Thus, standard ATAPI CD-ROM/DVD-ROM drives have to be modified to include serial port 235 and other signal lines such as STATUS and LOAD/UNLOAD. Methods of implementing a serial port and other signal lines for communicating with an external device are well known. Therefore, details of implementing the modifications are not discussed in detail to avoid obscuring aspects of the present invention.

According to the jukebox architecture as shown in FIG. 2, jukebox controller 240 is not connected to a host-jukebox bus for receiving controller signals directly from a host computer. Rather, jukebox controller 240 receives controller signals via ATAPI drives 230a and 230b and via serial connection 260. In the present embodiment, controller signals may include commands such as a "move" signal for directing jukebox controller 240 to move a particular computer-readable media from storage slots to the ATAPI drives. In the present embodiment, serial connection 260 may also be used to communicate information of the computer-readable media currently loaded into the ATAPI drives. Serial connection 260 is also used for transmitting ATAPI access commands, such as "PLAY," "SCAN," "PAUSE," etc., from jukebox controller 240 to ATAPI drives 230*a* and 230*b*.

In addition to serial connections 260, ATAPI drives 230*a* and 230*b* are also coupled to jukebox controller 240 via parallel connections to receive load/unload signals and to transmit chucking and unchucking status to jukebox controller 240. It is important to note that the load/unload signal and the chucking and unchucking status signals are transmitted across separate signal lines, which do not constitute as part of serial connection 260. The load/unload signal controls the timing of the loading and unloading of the disks and chucking and unchucking of the media. It is also important to note that ATAPI drives 230*a* and 230*b* receive load/unload signals from two locations: the host computer via IEEE 1394 bus 220 and ATAPI bridge 210, and front panel interface 250 via jukebox controller 240 and serial connections 260. More details regarding the front panel interface 250 will be discussed in the following.

In conventional CD-ROM jukebox systems, such as SCSI CD-ROM jukebox 100, disc access operations of the SCSI CD-ROM drives 130*a* and 130*b* are completely controlled by host computer through SCSI bus 110. In contrast, in one embodiment of the present invention, disc access operations of ATAPI drives 230*a* and 230*b* may be directly controlled by host computer, or by front panel interface 250 via jukebox controller 240 and serial connection 260. For instance, a user may input commands such as "PLAY," "PAUSE," "SCAN," "STOP," etc. at front panel interface 250, and the commands will be transmitted to ATAPI drives 230*a* and 230*b*.

In one embodiment of the present invention, the jukebox 200 further comprises a front panel interface 250 which allows the jukebox 200 to be used as a stand alone audio or video appliance to play audio CDs or video DVDs without host PC intervention. Front panel interface 250 may comprise a plurality of control knobs and buttons 252 for allowing users to input jukebox control commands, such as "SELECT PLAY LIST," "SELECT PLAY MODE," "PLAY/SCAN," "STOP/PAUSE," etc. Signals input through front panel interface 250 are first communicated to jukebox controller 240, and then communicated to the ATAPI drive (s) 230*a* and 230*b* via serial connections 260. In addition, because of the presence of serial connection 260, jukebox 200 is capable of displaying inventory information of the stored computer-readable media, and other information such as a play list.

Further, in the particular embodiment as illustrated in FIG. 2, jukebox 200 further comprises a memory unit 242 for storing inventory information of the computer-readable media stored within jukebox 200. For instance, jukebox 200 may scan all the audio CDs stored in its storage slots, and may store all the album titles or volume descriptions within memory unit 242. This information may then be displayed on LCD panel 254 of front panel interface 250. Jukebox 200 may further comprise another memory unit 244 for storing other information such as play lists.

One significant advantage of the present invention over conventional SCSI CD-ROM jukeboxes is that the IEEE 1394 interface allows more daisy-chain capability. Using the IEEE 1394 bus 220, a maximum number of 62 jukeboxes may be daisy-chained, providing a tremendous amount of on-line capacity. In addition, the IEEE 1394 interface includes "hot-plug" features. That is, the IEEE 1394 bus 220 allows devices to be hot-plugged without rebooting the host computer. These features are particularly useful for connecting the present invention to other home audio and visual appliances.

It is important to note that one major difference between conventional SCSI CD-ROM jukeboxes and the present invention is that expensive SCSI LSI circuits and complicated SCSI firmware are eliminated from the jukebox controller 240. In place of the SCSI hardware and firmware, serial ports are implemented in the jukebox controller 240. Since serial ports are much simpler than the SCSI interface, manufacturing and development cost of the jukebox are lower than conventional SCSI jukeboxes. Since most commercially available embedded processors include a serial interface, implementation costs for such a design are also low, and modifications to existing ATAPI drives are also minimal. An additional benefit of the present invention is that ATAPI drives are less costly than ATAPI drives and are more widely available. Lastly, an inexpensive processor such as an inexpensive 8-bit processor can be used for processor 243.

Figure 3:
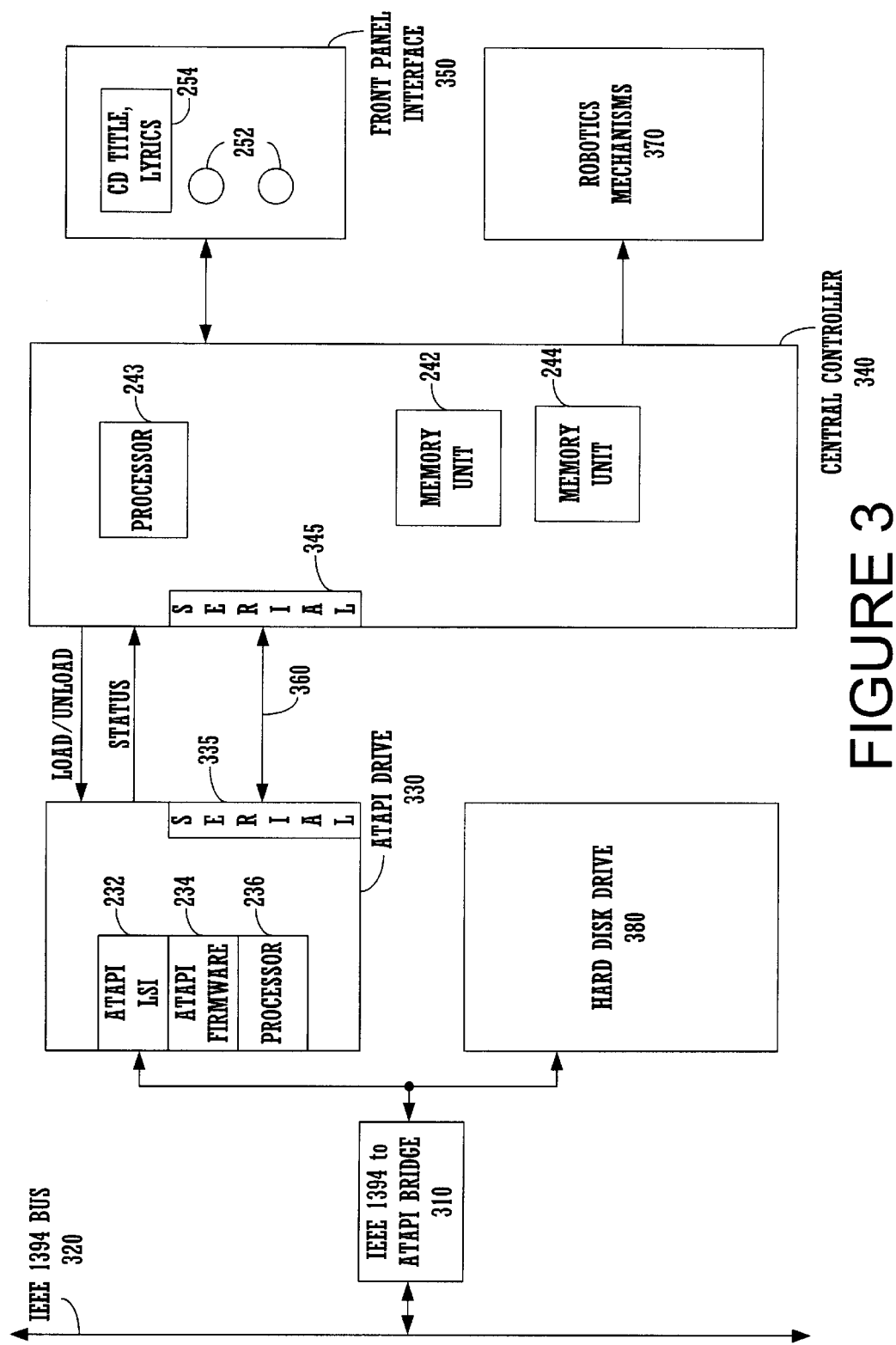
FIG. 3 illustrates a block diagram of a jukebox device according to an alternate embodiment of the present invention.

FIG. 3 illustrates a block diagram of a CD-ROM/DVD-ROM jukebox 300 according to another embodiment of the present invention. As illustrated, jukebox 300 includes an IEEE 1394 to ATAPI bridge (ATAPI bridge) 310 for coupling to an IEEE 1394 bus 320, an ATAPI drive 330 coupled to ATAPI bridge 310 for receiving jukebox control commands from a host computer (not shown) and for transferring data to and from other devices coupled to the IEEE 1394 bus 320. A jukebox controller 340 coupled to ATAPI drive 330 for receiving jukebox control commands such as drive access signals, load/unload signals, etc. ATAPI drive 330 also includes ATAPI LSI 232, ATAPI firmware 234, and processor 236. In addition, jukebox controller 340 is coupled to control robotics mechanisms 370 for mechanically moving computer-readable media from storage slots (not shown) to ATAPI drive 330. Furthermore, a front panel interface 350 is coupled to jukebox controller 340. Significantly, ATAPI drive 330 and the jukebox controller 340 each includes a serial port 345 for forming serial connections 360. Jukebox controller 340 also includes processor 243, and memory units 242 and 244.

The embodiment as illustrated in FIG. 3 is similar to the particular embodiment illustrated in FIG. 2. In this embodiment of the present invention, jukebox 300 includes an EIDE hard disk drive (HDD) 380. In this embodiment, the HDD 380 acts as the local storage for caching data to compensate for slow access time of the robotics mechanism 370 and ATAPI drive 330. Further, HDD 380 may be used for storing music titles, lyrics, and other information (e.g. SONY MIDAS database) and mini-disc (MD) quality audio tracks converted from CD titles in jukebox 300 using the companion encoder software running on the host computer. One advantage of the present embodiment is that, although the jukebox 300 includes a single ATAPI drive 330, data stored in HDD 380, such as MD quality audio tracks, may be played simultaneously as other CD or CD-ROM titles are being accessed in the jukebox. An additional benefit of including a hard disk drive in jukebox 300 is that a full play list and full inventory information of the computer-readable media stored in jukebox 300 may be stored in the hard disk drive. In this way, when used with a PC, the full play list and the complete inventory information such as all song titles and artists names may be retrieved from the HDD 380 and displayed on PC monitor.

A novel jukebox for storing and playing a large number of computer-readable media, such as audio CDs, CD-ROMs, and DVD-ROMs is thus disclosed. The novel jukebox is a significant improvement over conventional SCSI jukeboxes which can only be used as computer peripheral devices and not as a stand alone equipment. Particularly, one embodiment of the present invention is designed to be used both as both a computer peripheral and as a standalone home audio and visual equipment. In order to make the present invention more attractive to home applications, an IEEE 1394 bus, which is a popular bus interface for home electronics, is used. In addition, in sharp contrast to convention systems, a serial connection is provided between the media drives and the jukebox controller such that the drives may be controlled via a front panel interface and such that inventory information and play lists may be displayed. In addition, the jukebox of the present invention is also cost effective because relatively inexpensive ATAPI drives are used in place of more expensive SCSI drives, and because SCSI hardware and firmware no longer need to be implemented on the jukebox controller.

What is claimed is:

1. A jukebox for storing and accessing a plurality of computer readable media, said jukebox configured for coupling to a host device wherein said host device is an IEEE 1394 compatible device, and comprising:
   a drive coupled to receive a first drive access signal and a robotics control signal from said host device, wherein access operations to said drive are controlled by said drive access signal, and wherein said drive is an ATAPI device;
   an IEEE 1394-to-ATAPI bridge for coupling said host device to said drive
   a panel interface for receiving jukebox control signals from a user;
   a central controller coupled to receive said robotics control signal from said drive and coupled to receive control signals from said panel interface; and
   a robotics unit coupled to be controlled by said central controller, wherein said robotics unit is configured for moving a selected one of said plurality of computer readable media to said drive according to said robotics control signal and according to said control signals from said user of said panel interface; and
   wherein said drive further includes a first serial port and wherein said central controller includes a second serial port for coupling to said first serial port to form a serial communication path, further wherein said robotics control signal is transmitted to said central controller by said serial communication path.

2. The jukebox according to claim 1 wherein said jukebox control signals further comprise a second drive access signal for controlling accesses to said drive, and wherein said second drive access signal is transmitted from said central controller to said drive via said serial communication path.

3. The jukebox according to claim 1 wherein said jukebox control signals further comprise a second robotics control signal for controlling said robotics unit.

4. The jukebox according to claim 1 wherein said central controller further comprises:
   a first memory unit for storing inventory information of said plurality of computer readable media; and
   a second memory unit for storing play list information of said plurality of computer readable media, wherein said inventory information and said play list information are accessible via said front panel interface.

5. The jukebox according to claim 1 further comprising a hard disk drive coupled to said drive and configured for coupling to said host device for providing cache functions to said drive and for providing simultaneous accessing functionality.

6. The jukebox according to claim 1 wherein said plurality of computer readable media includes a plurality of audio compact discs.

7. The jukebox according to claim 1 wherein said plurality of computer readable media includes a plurality of digital video-disks read-only-memories (DVD-ROMs).

8. A jukebox for storing and accessing a plurality of computer-readable disks, said jukebox configured for coupling to a host computer wherein said host computer is an IEEE 1393 compatible device, and comprising:
   a plurality of storage slots each for storing one of said plurality of computer-readable disks;
   a first drive configured for receiving jukebox control signals from said host computer, wherein access operations of said first drive are controlled by said jukebox control signals, said drive having a first serial port, and wherein said first drive is an ATAPI device;
   a second drive configured for receiving said jukebox control signals from said host computer and coupled to said first drive, wherein access operations of said second drive are controlled by said jukebox control signals, and wherein said second drive is an ATAPI device;
   an IEEE 1393-to-ATAPI bridge for coupling said host device to said first drive and said second drive;
   a central controller coupled to receive said jukebox control signals from said first drive and said second drive, said central controller having a third serial port for coupling with said first serial port and said second serial port to form a plurality of serial communication paths, wherein said jukebox control signals are transmitted between said central controller and said first drive and between said central controller and said second drive via said serial communication paths;
   a front panel interface for receiving control signals from a user, wherein said panel interface is coupled to provide said control signals to said drives via said central controller and said serial communication paths; and
   a robotics unit coupled to be controlled by said central controller, wherein said robotics unit is configured for moving a user-selected one of said plurality of computer readable disks between said storage slots and said first drive and said second drive according to said jukebox control signals.

9. The jukebox according to claim 8 wherein said central controller further comprises:
   a first memory unit for storing inventory information of said plurality of computer readable media; and
   a second memory unit for storing play list information of said plurality of computer readable media, wherein said inventory information and said play list information are accessible via said front panel interface.

10. The jukebox according to claim 8 wherein said drive is an ATAPI DVD-ROM drive.

11. The jukebox according to claim 8 further comprising a hard disk drive coupled to said drive and configured for coupling to said host device for providing cache functions to said drive and for providing simultaneous accessing functions to said jukebox.

12. A jukebox for storing and accessing a plurality of computer readable media, said jukebox configured for coupling to a host device wherein said host device is an IEEE 1393 compatible device, said jukebox comprising:

media accessing means coupled to receive a first drive access signal and a robotics control signal from said host device, wherein said media accessing means is controlled according to said drive access signal, and wherein said media accessing means includes an ATAPI interface;

controller means coupled to receive said robotics control signal from said media accessing means;

mechanical means coupled to be controlled by said controller means, wherein said mechanical means is configured for moving a selected one of said plurality of computer readable media to said media accessing means according to said robotics control signal; and panel interface means for receiving jukebox control signals from a user, wherein interface means is coupled to provide said jukebox control signals to said controller means, wherein said media accessing means includes a first serial port and wherein said controller means includes a second serial port for coupling to said first serial port to form a serial communication path, and wherein said robotics control signal is transmitted to said controller means via said serial communication path.

13. The jukebox according to claim 12 wherein said jukebox control signals further comprise a second drive access signal for controlling accesses to said media accessing means and wherein said second drive access signal is transmitted from said controller means to said media accessing means via said serial communication path.

14. The jukebox according to claim 12 wherein said jukebox control signals further comprise a second robotics control signal for controlling said mechanical means.

15. The jukebox according to claim 12 wherein said central controller further comprises:

means for storing inventory information of said plurality of computer readable media; and means for storing play list information of said plurality of computer readable media, wherein said inventory information and said play list information are accessible via said panel interface means.

16. The jukebox according to claim 12 further comprising:

means for providing cache functions to said media accessing means; and means for providing simultaneous access functions to said jukebox.

17. The jukebox according to claim 12 wherein said plurality of computer readable media includes a plurality of audio compact discs.

18. The jukebox according to claim 12 wherein said plurality of computer readable media includes a plurality of digital-video-disks read-only-memories.

* * * * *